Figure 7:
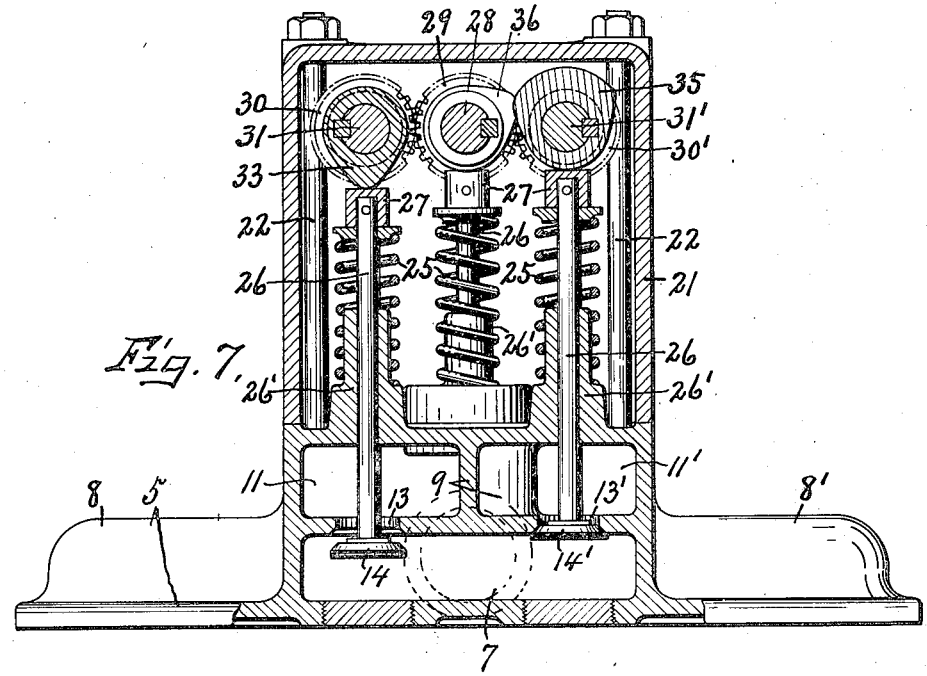
Figure 8:
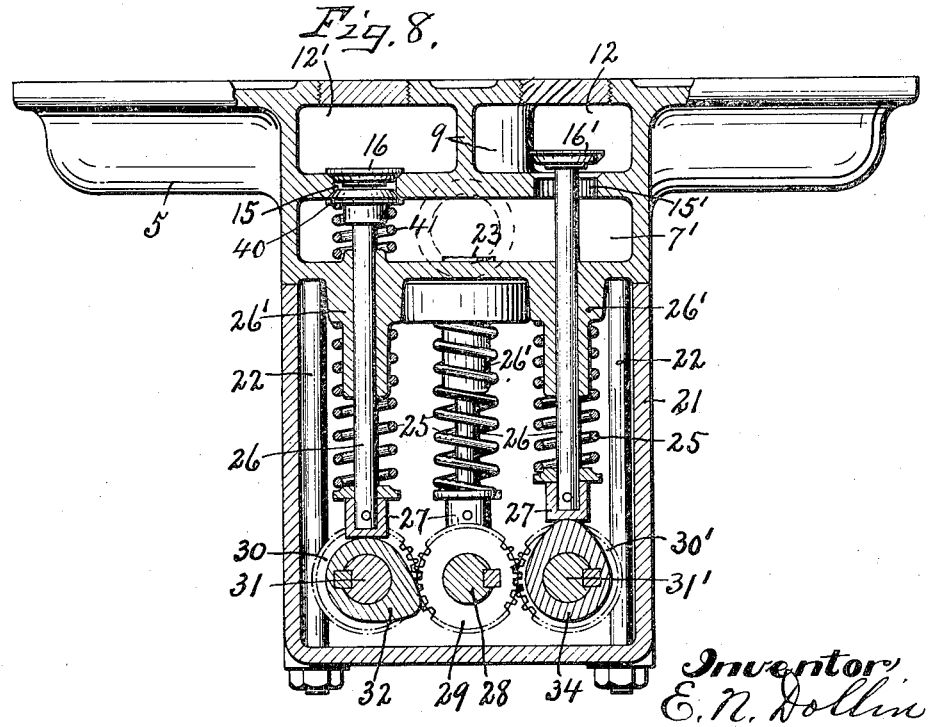

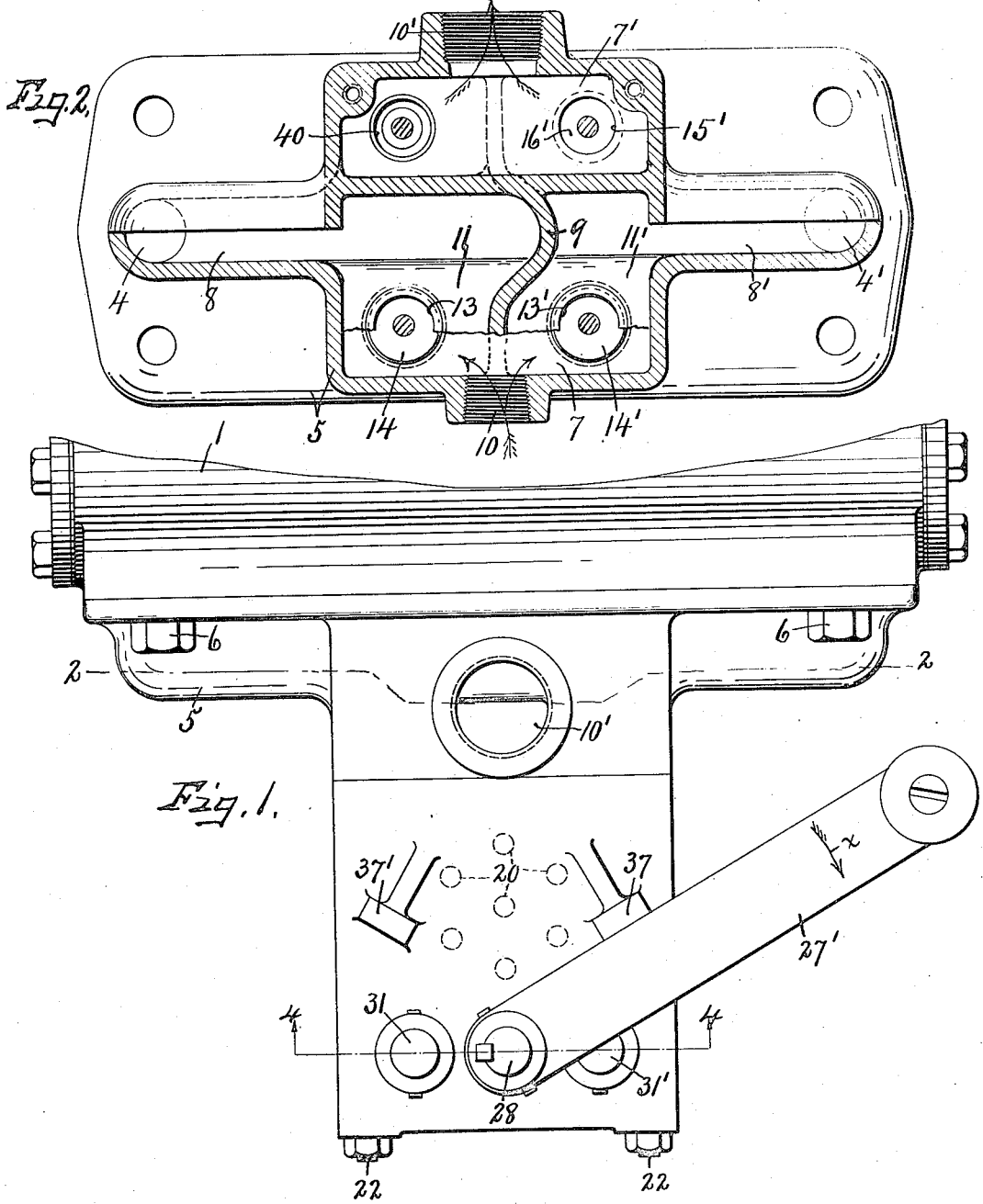

Sept. 25, 1923.  E. N. DOLLIN  1,469,074
FLUID PRESSURE CONTROL MECHANISM
Filed April 15, 1920   5 Sheets-Sheet 2
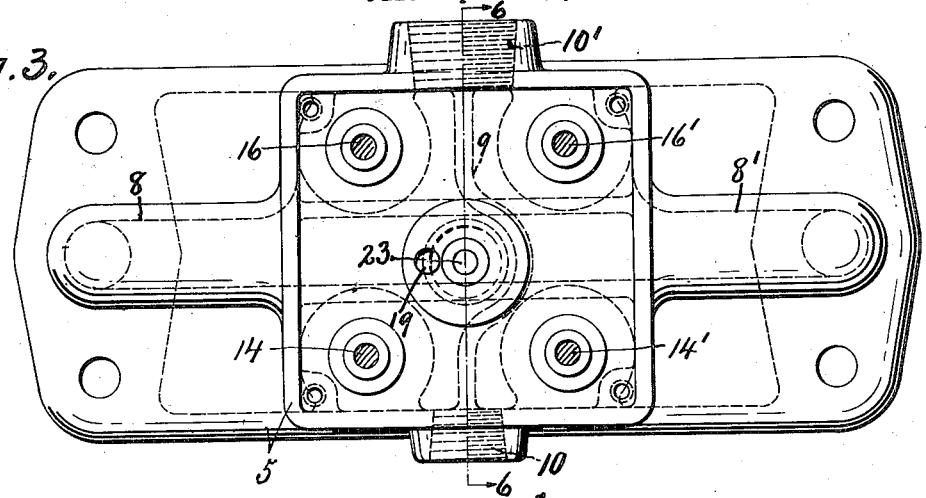
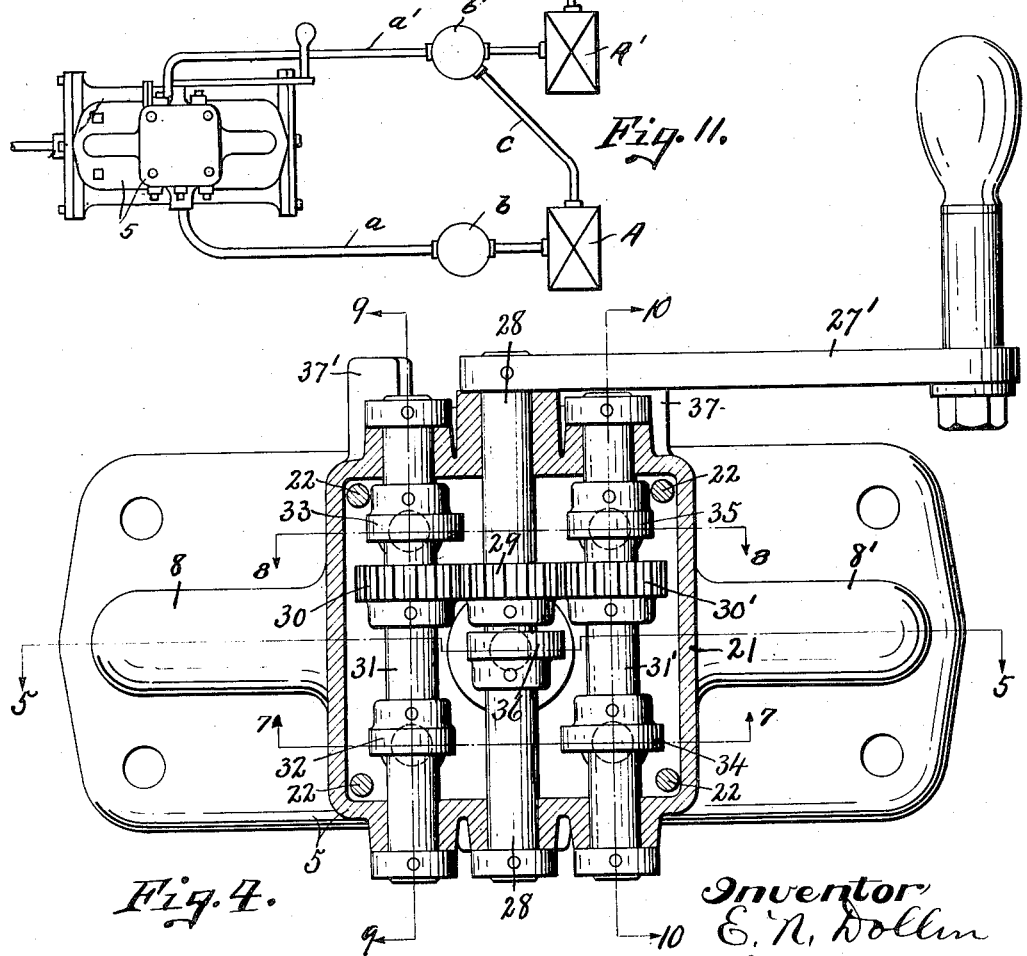

Sept. 25, 1923.
E. N. DOLLIN
1,469,074
FLUID PRESSURE CONTROL MECHANISM
Filed April 15, 1920    5 Sheets-Sheet 3
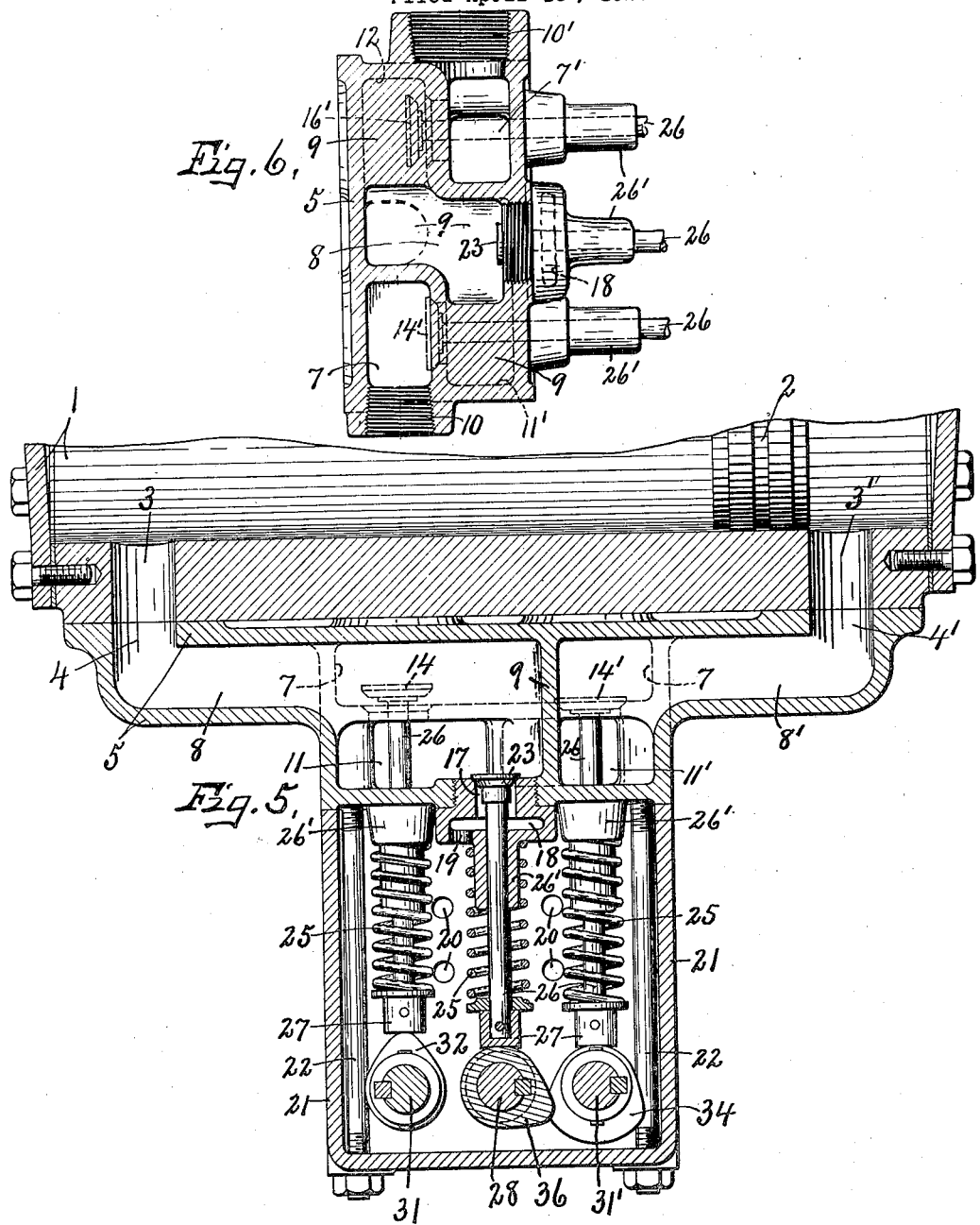
Inventor
E. N. Dollin
By Howard P. Denton
Attorney Inventor,
E. N. Dollin
By Howard P. Denison
Attorney

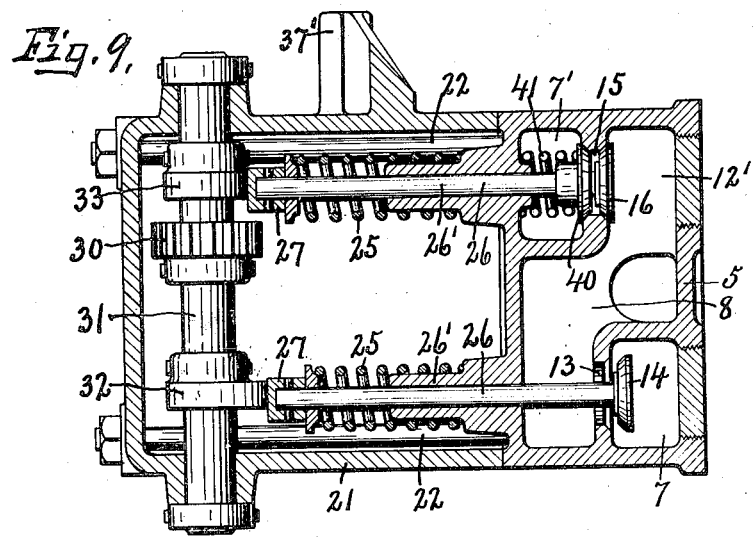
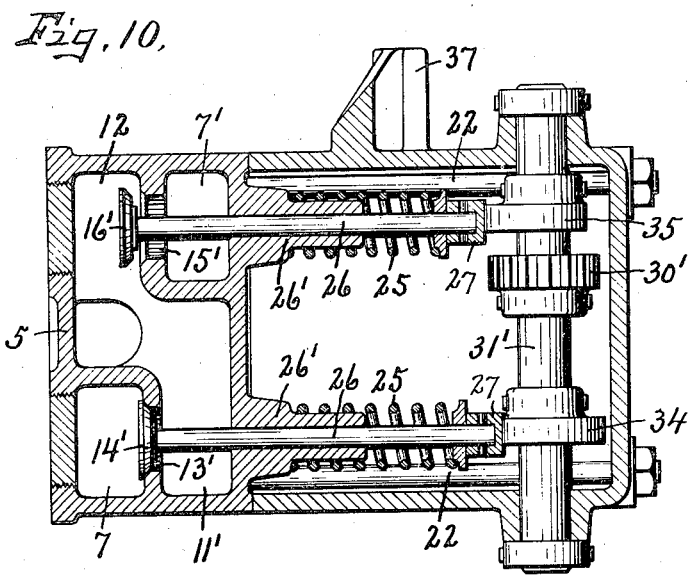

Patented Sept. 25, 1923.

1,469,074

UNITED STATES PATENT OFFICE.

EDGAR N. DOLLIN, OF SYRACUSE, NEW YORK.

FLUID-PRESSURE-CONTROL MECHANISM.

Application filed April 15, 1920. Serial No. 374,222.

*To all whom it may concern:*

Be it known that I, EDGAR N. DOLLIN, of Syracuse, in the county of Onondaga, in the State of New York, have invented new and useful Improvements in Fluid-Pressure-Control Mechanism, of which the following, taken in connection with the accompanying drawings, is a full, clear, and exact description.

This invention relates to certain improvements in fluid pressure controllers of the class set forth in my pending application, Ser. No. 312,848, filed July 23, 1919, the essential difference being that in the prior application the passage of the fluid, as air, to and from the working ports is controlled by a rotary valve, while in my present application, it is controlled, by a plurality of poppet valves which have certain advantages over the rotary valve, in making the system air tight and reducing the liability of leakage, and also requiring less power to operate the valves, the valve mechanism being operative with a light stroke of the lever.

The main object is the utilization and control of compressed atmospheric air or other elastic fluid in the performance of some useful work, particularly where a relatively low pressure above atmosphere is to be followed by a considerably greater pressure, as for example, in the operation of the die carriage of a die casting machine, by first moving the carriage to bring the die into registration with the outlet for the molten metal under a relatively lower pressure and then pneumatically locking it in that position under a higher pressure with sufficient force to positively resist another pressure which is used to force the molten metal into the die or mold.

The source of supply for the compressed air to the controller may be through the medium of a storage tank or reservoir, or directly from a suitable pump, either of which must, of course, have an air intake and an air outlet, and one of the specific objects of the invention is to render the operation of a fluid pressure working system of this character more expeditious and economical than has heretofore been practised, by establishing and maintaining differential pressures in said system considerably above atmospheric pressure, and at the same time permitting the use of the maximum high pressure when necessary without resistance of the relatively lower pressure in the working system.

Another specific object is to provide simple and efficient means for opening and closing the valves of the controller at the proper time as may be necessary in the performance of some particular work.

Other objects and uses will be brought out in the following description:

In the drawings—

Figure —1— is a top plan of my improved controller and adjacent portion of a cylinder containing a reciprocating piston which is adapted to be operated by the compressed air governed by the operation of the controller.

Figure —2— is a longitudinal vertical sectional view taken approximately in the plane of line 2—2, Figure —1—.

Figure —3— is a front face view of the valve case shown in Figures —1— and —2— omitting the valve operating mechanism and housing therefor.

Figure —4— is a longitudinal vertical sectional view taken on lines 4—4, Figure —1—, the gears and cams and supporting shafts therefor being shown in elevation.

Figure —5— is a horizontal sectional view taken in the plane of line 5—5, Figure 4.

Figure —6— is a transverse vertical sectional view of the valve case taken in the plane of line 6—6, Figure —3—.

Figures —7— and —8— are horizontal sectional views taken, respectively, in the planes of lines —7—7— and 8—8, Figure —4—.

Figures —9— and —10— are transverse vertical sectional views taken, respectively, in the planes of lines 9—9 and 10—10, Figure 4.

Fig. 11 is a diagrammatic view on a reduced scale of a means for supplying air to the controller and motor.

In order that one use of my invention may be clearly understood, I have shown a portion of a cylinder —1— having a reciprocatory piston —2— movable therein between suitable ports —3— and —3'— in one side of the cylinder for registration with similar working or service ports —4— and —4'— of a valve case —5— which is secured by bolts —6— to the adjacent side of said cylinder to form air tight joints around the registering ports.

This valve case —5— is provided with separate lengthwise chambers —7— and —7'— at opposite sides of a pair of central lengthwise chambers —8— and —8'— which are separated by an intermediate transverse partition —9— and have their outer ends communicating, respectively, with the working ports —4— and —4'—, said chambers —7— and —7'— being disposed in different vertical planes so that the outer wall of the chamber —7— and inner wall of the chamber —7'— are disposed in substantially the same lengthwise vertical plane.

Chamber —7— is provided with an inlet —10— adapted to be connected by any suitable conduit $a$ and reservoir $b$ to the outlet of a high air pressure pump A, while the chamber —7'— is provided with an outlet —10'— for connection by any suitable conduit $a'$ and a reservoir $b'$ to a lower pressure air pump A' to supply air under pressure considerably greater than atmospheric pressure, which reservoir is also connected by a pipe $c$ to the intake of the high pressure pump A, whereby the latter may operate under pressure considerably above atmospheric pressure both at the intake and outlet to avoid the necessity of intermittingly raising the pressure from atmosphere to maximum working pressure, thus permitting the pressure at the intake to be boosted expeditiously to the desired degree with considerably less power than would be required to raise the pressure from atmosphere to that degree.

The central lengthwise chambers —8— and —8'— are provided, respectively, with branch chambers —11— and —11'— extending downwardly across the outer wall of the chamber —7— at the opposite sides of the transverse partition —9—, said chambers —8— and —8'— being also provided with upwardly extending branch chambers —12— and —12'— across the inner walls of the chamber —7'— and at opposite sides of the same partition —9—.

The chamber —7—, which may be termed the high pressure chamber, is common to both of the branch chambers —11— and —11'— and is connected thereto by separate ports —13— and —13'— controlled by poppet valves —14— and —14'—.

In a similar manner, the chamber —7'—, which may be termed the low pressure chamber, is common to both of the branch chambers —12— and —12'—, and connected thereto by ports —15— and —15'— controlled by poppet valves —16— and —16'—.

The chamber —8— is connected by a port —17— to the atmosphere through the medium of passages —18— and —19— and —20—, the latter being formed in one of the side walls of a supplemental casing or housing —21—, which is secured by bolts —22— to the outer wall of the valve case —5—, for receiving and enclosing the greater part of operating mechanisms for the several valves, as hereinafter more fully described, the port —17— being controlled by a relief valve —23—, Figures —5— and —6—.

All of these valves are preferably of the self-closing poppet type adapted to open inwardly against the pressure within their respective chambers and against the action of suitable retracting springs, as —25—, and are mounted upon parallel stems —26— which are movable in suitable guides 26' in the outer wall of the valve case —5— and are provided at their outer ends with bearings —27— for engagement with their respective operating cams hereinafter described.

The means for opening the several valves comprises a hand lever —27'— secured to the upper end of a rock shaft —28—, which is journaled in a vertical position in suitable bearings in the opposite side walls of the housing —21— and is provided with a gear —29— meshing with similar gears —30— and —30'— on parallel shafts —31— and —31'— at opposite sides of and parallel with the rock shaft —28—. The shaft —31— is disposed in substantially the same transverse vertical plane as the valves —14— and —16— across the outer faces of the bearings —27— on the stems thereof, and is provided with a pair of cams —32— and —33— for opening said valves against the action of their respective springs as the shaft is rotated.

The shaft —31'— is disposed in substantially the same transverse vertical plane as the valves —14'— and —16'— across the outer faces of the bearings —27— on the outer ends of the stems of said valves, and is provided with a pair of cams —34— and —35— for opening the last named valves against the action of their respective springs as the shaft is rotated.

The intermediate or main driving shaft —28— is disposed in the same transverse vertical plane as the relief valve —23— and is provided with a cam —36— for engagement with the corresponding bearing —27— to open said relief valve against the action of its retracting spring during the rotation of the shaft —28—.

The hand lever —27— is movable in a horizontal plane through an arc of more than 180 degrees between limiting stops —37— and —37'— at opposite sides of its axis of movement and is normally engaged with the stop —37— to return the piston —2— to its normal position at the right hand end of the cylinder —1— as shown in Figure —5—.

The movements of this piston are produced by fluid pressure admitted to one or the other of the ports —3— or —3'—, the fluid under pressure to and from said ports being controlled by the manipulation of the valves through the medium of the hand lever —27'— and cams operated thereby, and in this particular instance may be employed to open, close and lock the die carriage of a die casting machine, or for any other purpose in which it is desired to utilize the differ-ential pressures previously referred to.

The several valve operating cams are constructed and arranged in such relation that when the hand lever —27'— is in its normal or starting position, as shown in Figures —1— and —4—, the cams —32— and —35— will have been adjusted to open the corresponding valves —14— and —16'—, while the remaining cams will have been adjusted to allow the closing of the corresponding valves.

Under these conditions, the high pressure fluid, under say 200 pounds per square inch, entering the inlet—10— passes first into the chamber —7— and thence through the open valve —14— into the chambers —11— and —8—, respectively, and thence through the ports —4— and —3— into the left hand end of the cylinder —1— for moving the piston—2— to the right or to its position shown in Figure —5—, the fluid in advance of the piston being exhausted through the ports —3'— and —4'— and thence through the chambers—8'— and —12— through the open port—15'— and into the chamber —7'— and thence outwardly through the outlet —10'— to the intake of the reservoir or other source of fluid pressure supply, at which intake a fluid pressure considerably above atmospheric pressure, or say 100 pounds per square inch, is maintained by any suitable means such, for example, as that shown in my pending application referred to.

The movement of the piston from left to right, or to the position shown in Figure —5— is, therefore, effected by the excess pressure of the fluid admitted through the inlet —10— above that at the outlet —10'— or sufficient to cause the return or opening of the die carriage when the device is used in the operation of a die casting machine, it being understood that when the valves —14— and —16'— are open against the action of their respective retracting springs by means of the corresponding cams —32— and —35—, the remaining cams —34— —33— and —36— will be in position to permit the closing of the corresponding valves —14'— —16— and —23— by their respective springs.

Now, when it is desired to close the die carriage or to bring the opening of the die into close registration with the outlet of the molten metal reservoir for receiving the molten metal, the hand lever —27— is adjusted from its normal position in the direction indicated by arrow "X" to an intermediate position midway between the limiting stops —37— and —37'— by which operation the several cams are adjusted so as to permit the closing of the valves —14— and —16'— and to open the valves —14'— and —16—, leaving the relief valve —23— closed.

This adjustment of the valves allows the high pressure fluid to enter through the inlet —10— into the chamber —7— and thence through the open port —13'— into the chambers —11'— and —8'— and thence through the ports —4'— and —3'— into the cylinder at the right hand end of the piston —2—, Figure —5—, for moving said piston to the left, during which movement the fluid in advance of the piston exhausts through the ports —3— and —4— into the chambers —8— and —12'—, and thence through the open port —15— into the chamber —7'— and out through the outlet —10'— to the intake of the high pressure source of supply, this movement of the piston being effected by the differential pressures both above atmospheric pressure at opposite ends thereof, and may be utilized in the closing of the die carriage of a die casting machine ready to receive the molten metal.

At this time it is necessary to hold the piston and die carriage operated thereby against the counter pressure used in forcing the molten metal into the die or mold, and to effect the result, the hand lever —27— is again shifted in the same direction from its intermediate position into engagement with the left hand stop —37'—, Figure —1—, by which operation the several cams are adjusted to permit the closing of the valves —14—, —16— and —16'— and opening of the relief valve —23'—, while the valve —14'— is still held in its open position by reason of the fact that its operating cam —34— has a longer concentric bearing face as shown more clearly in Figure —7—.

By this latter adjustment, the pressure at the service port 4—4, or left hand end of the piston, is reduced to atmosphere and communication between said port and the exit port —10'— is cut off while the maximum high pressure is still maintained at the service port —4'— to hold the piston at the limit of its left hand stroke and to lock the die carriage in its closed position.

This pneumatic locking of the piston against return movement may be continued as long as may be desired or until the hand lever —27— and cams operated thereby are restored to their normal or starting positions to again open the valves —14— and —16'— and allow the remaining valves to close ready for repetition of the operation described.

In order to reduce the liability of leakage by back pressure through the port —15— when the valve —16— is closed, said port is provided with a supplemental valve —40— normally held to its seat by a comparatively light spring —41— and adapted to be opened into the chamber —7'— by the higher pressure within the chamber —12'— when the valve —16— is opened, and to automatically close when the valve —16— is closed.

It will be noted that all the valves, except the valve —40—, open into their respective high pressure chambers or against the pressure therein, which greatly facilitates the closing of said valves by their respective retracting springs when released by the proper adjustment of their respective cams, all of which contributes materially to the efficiency and reliability of the controller.

The operation will be clearly understood from the foregoing description in connection with the drawings, and while I have described the movement of the piston as being utilized in the operation of the die carriage of a die casting machine, it is evident that the differential pressures produced at the working ports —4— and —4'— of the controller may be used for many other different purposes, and, therefore, I do not wish to limit myself to any particular use, nor to the exact details of the pressure controlling mechanism, nor to the specific location of the check valve —40— which may be positioned anywhere in the exhaust line.

What I claim is:

1. A fluid pressure controlling mechanism having an intake port, an exit port and separate service ports, means for maintaining unequal pressures above atmospheric pressure at the intake and exit ports, respectively, a valve controlling communication between the intake port and one of the service ports, a separate valve controlling communication between the other service port and exit port, and means adjustable to a certain position for simultaneously opening both valves.

2. A fluid pressure controlling mechanism having an intake port, an exit port and separate service ports, means for maintaining unequal pressures above atmospheric pressure at the intake and exit ports, respectively, a valve controlling communication between the intake port and one of the service ports, a separate valve controlling communication between the other service port and exit port, and means adjustable to a certain position for simultaneously opening both valves, and to another position for holding the first named valve open and permitting the closing of the second named valve, and means for closing the second named valve when said operating means is adjusted to said other position.

3. A fluid pressure controlling mechanism having an intake port and exit port and separate service ports, means for maintaining unequal pressures above atmospheric pressure at the intake port and exit port, respectively, a valve controlling communication between the intake port and one of the service ports, a separate valve controlling communication between the other service-port and the exit-port, a vent-valve controlling communication between one of the service-ports and the atmosphere, means adjustable to one position for opening the first and second named valves, and to another position for holding the first named valve open and permitting the closing of the second named valve, and additional means for opening the vent valve while the second named valve is closed.

4. A fluid pressure controlling mechanism having an intake port, an exit port, and separate service ports, means for maintaining a relatively high fluid pressure at the intake port, and a relatively lower pressure above atmospheric pressure at the exit port, a valve controlling communication between the intake port and one of the service ports, a separate valve controlling communication between the other service port and exit port, and means adjustable to a certain position for opening both of said valves.

5. A fluid pressure controlling mechanism having an intake port, an exit port, and separate service ports, means for maintaining a relatively high fluid pressure at the intake port, and a relatively lower pressure above atmospheric pressure at the exit port, a valve controlling communication between the intake port and one of the service ports, a separate valve controlling communication between the other service port and exit port, and means adjustable to a certain position for opening both of said valves, and to another position for holding the first named valve open and permitting the second named valve to close, means for closing the second named valve, and additional means for opening communication between said other port and the atmosphere while the second named valve is closed.

6. In combination with a cylinder having service ports, a piston movable in the cylinder between said ports, a fluid pressure controlling mechanism having service ports registering with those of the cylinder and also provided with an intake port and an exit port, means for maintaining a relatively high fluid pressure at the intake port and a relatively lower pressure above atmospheric pressure at the exit port, a valve controlling communication between the intake port and one of the service ports, a separate valve controlling communication between the other service port and the exit port, means adjustable to one position for opening both valves, and to another position for holding the first named valve open and permitting the second named valve to close, means for closing the second named valve, and additional means for opening communication between said other service port and the atmosphere when the second named valve is closed to relieve the back pressure on the piston and permit the latter to be operated under the full force of the high pressure without materially affecting the lower pressure above atmospheric pressure at the exit port.

7. The combination with a cylinder having a pair of ports and a piston movable between said ports, of a fluid pressure controlling mechanism having a pair of service ports connected with those of the cylinder, and also provided with an intake port and an exit port, means for maintaining a relatively high fluid pressure at the intake port and a relatively lower pressure above atmospheric pressure at the exit port, a valve controlling communication between the intake port and one of the service ports, a separate valve controlling communication between the other service port and the exit port, means adjustable to a certain position for opening both of said valves, and to another position for permitting said valves to close, and separate devices for closing said valves.

8. The combination with a cylinder having a pair of ports and a piston movable between said ports, of a fluid pressure controlling mechanism having a pair of service ports communicating with the cylinder ports, and also provided with an intake port and an exit port, means for maintaining unequal pressures above atmospheric pressure at the intake port and exit port, respectively, a normally closed self-closing valve controlling communication between the intake port and one of the service ports, a separate normally closed self-closing valve controlling communication between the other service port and the exit port, and means adjustable to a certain position for opening both valves.

9. The combination with a cylinder having a pair of ports and a piston movable between said ports, of a fluid pressure controlling mechanism having a pair of service ports communicating with the cylinder ports, and also provided with an intake port and an exit port, a normally closed self-closing valve controlling communication between the intake port and one of the service ports, a separate normally closed self-closing valve controlling communication between the other service port and the exit port, means adjustable to a certain position for opening both valves, and to another position for holding the first named valve open and for releasing the second named valve and additional means for opening communication between the said other service port and the atmosphere when the second named valve is closed.

10. A fluid pressure controlling mechanism having an intake port, an exit port, means for maintaining unequal pressures above atmospheric pressure at the intake port and exit port, respectively, and separate service ports, separate valves controlling communication between the intake port and service ports, respectively, additional valves controlling communication between the exit port and service ports, respectively, means adjustable to one position for opening the valve between the intake port and one of the service ports and the valve between the exit port and the other service port, said means being adjustable to another position for opening the remaining valves and permitting the previously opened valves to close, and separate devices for closing said valves.

11. A fluid pressure controlling mechanism having an intake port, an exit port, and separate service ports, separate valves controlling communication between the intake port and service ports, respectively, additional valves controlling communication betwen the exit port and service ports, respectively, means adjustable to one position for opening the valve between the intake port and one of the service ports and the valve between the exit port and the other service port, said means being adjustable to another position for opening the remaining valves and permitting the previously opened valves to close, and separate devices for closing said valves, the valve opening means being adjustable to a third position for holding one of the last opened valves in its open position and permitting the other last opened valve to close, and means actuated by the adjustment of the valve opening means to the third position for opening communication between one of the service ports and the atmosphere.

In witness whereof I have hereunto set my hand this 1st day of April, 1920.

EDGAR N. DOLLIN.

Witnesses:
H. E. CHASE,
ROSE G. CARROLL.